United States Patent
Zimmermann (10) Patent No.: US 11,327,175 B2
(45) Date of Patent: May 10, 2022

(54) METHOD FOR DETERMINING A SUBSTITUTE DISTANCE BETWEEN A LOCATION AND A SUBSTITUTE IMPACT POINT OF A PROJECTILE

(71) Applicant: Swarovski-Optik KG., Absam (AT)

(72) Inventor: Andreas Zimmermann, Fulpmes (AT)

(73) Assignee: Swarovski-Optik KG

( * ) Notice: Subject to any disclaimer, the term of this patent is extended or adjusted under 35 U.S.C. 154(b) by 442 days.

(21) Appl. No.: 16/138,406

(22) Filed: Sep. 21, 2018

(65) Prior Publication Data
US 2019/0094367 A1     Mar. 28, 2019

(30) Foreign Application Priority Data
Sep. 22, 2017   (AT) .............. A 50805/2017

(51) Int. Cl.
| | |
|---|---|
| G01S 17/42 | (2006.01) |
| F41G 1/473 | (2006.01) |
| F41G 3/16 | (2006.01) |
| F41G 3/06 | (2006.01) |
| G01S 7/48 | (2006.01) |

(52) U.S. Cl.
CPC .............. *G01S 17/42* (2013.01); *F41G 1/473* (2013.01); *F41G 3/06* (2013.01); *F41G 3/065* (2013.01); *F41G 3/165* (2013.01); *G01S 7/4808* (2013.01)

(58) Field of Classification Search
CPC ... F41G 3/06; F41G 3/08; F41G 1/473; G01C 3/04; A63B 24/0021; G01S 17/42; G01S 7/4808
See application file for complete search history.

(56) References Cited

U.S. PATENT DOCUMENTS

| | | | |
|---|---|---|---|
| 6,873,406 B1 | 3/2005 | Hines et al. | |
| 8,046,951 B2* | 11/2011 | Peters | F41G 1/473 42/111 |
| 8,172,139 B1 | 5/2012 | McDonald et al. | |
| 8,279,422 B2* | 10/2012 | Mooney | A63B 69/3658 356/28 |
| 8,733,647 B2* | 5/2014 | Roider | F41G 1/473 235/404 |
| 2015/0034722 A1 | 2/2015 | Roman et al. | |
| 2016/0202021 A1 | 7/2016 | Roman et al. | |

FOREIGN PATENT DOCUMENTS

| | | |
|---|---|---|
| AT | 511318 B1 | 12/2014 |
| EP | 1801614 A2 | 6/2007 |
| EP | 2148165 A2 | 1/2010 |
| GB | 2512915 A | 10/2014 |

OTHER PUBLICATIONS

Search Report for EP18195981 dated Feb. 19, 2019; 3 pages.

* cited by examiner

*Primary Examiner* — Elias Desta
(74) *Attorney, Agent, or Firm* — Lerner, David, Littenberg, Krumholz & Mentlik, LLP (57) ABSTRACT

A method for determining a substitute distance between a location and a substitute impact point of a projectile in a horizontal plane common with the location, the method determining a target distance between the location and a target arranged on a sight line, and the method determining an elevation angle formed by the sight line with the horizontal plane, wherein an equivalent horizontal distance is calculated as a substitute distance by correcting the target distance with at least one correction coefficient dependent on the elevation angle.

18 Claims, 4 Drawing Sheets

METHOD FOR DETERMINING A SUBSTITUTE DISTANCE BETWEEN A LOCATION AND A SUBSTITUTE IMPACT POINT OF A PROJECTILE

BRIEF SUMMARY OF THE TECHNOLOGY

The invention relates to a method for determining a substitute distance between a location and a substitute impact point of a projectile in a horizontal plane common with the location, the method determining a target distance between the location and a target arranged on a sight line and the method determining an elevation angle that the sight line forms with the horizontal plane, wherein the method calculates an equivalent horizontal distance as the substitute distance by correcting the target distance with at least one correction coefficient dependent on the elevation angle.

The invention also relates to a device for determining a substitute distance between a location and an impact point of a projectile in a horizontal plane common with the location when aiming at a target for an inclined shot with an elevation angle having a display for a value of the substitute distance, having a range finder for measuring a target distance, and having an inclinometer for measuring the elevation angle between a sight line to the target and the horizontal plane, wherein the device comprises a microprocessor arranged to calculate as the substitute distance an equivalent horizontal distance by correcting the target distance with a correction coefficient.

The invention also relates to a long-range optical device, in particular a rifle scope or a binocular or monocular telescope, with a device for determining a substitute distance to be referenced in place of the target distance for purposes of aiming at the target with the aiming device of a firearm, and a display for displaying a value of the substitute distance for a shooter when aiming.

Aiming devices, in particular trifle scopes, are typically mounted on the weapon and are zeroed in in conjunction with the latter. The term 'Weapons' refers to those weapons that fire a projectile directly at a target with an elongated and/or slightly curved trajectory. This zeroing in is accomplished at a fixed shooting distance of e.g. 100 m with a horizontally aligned reference line at a target by using munition typical for the weapon (load). In order to compensate the projectile drop over its trajectory between the firearm and the target, the barrel axis of the firearm is inclined by a superelevation angle relative to the reference line of the aiming device. The firearm is zeroed in by adjusting the superelevation angle such that the actual impact point of the projectile matches with the desired impact point, that is to the say the aimed at target. When taking an actual shot in practical use, deviations from these zeroing conditions must be taken in to account. Influence factors that modify the ballistics e.g. include air pressure and air temperature, the initial velocity and the drag coefficient and/or the ballistic coefficient of the projectile, canting of the firearm, or an uphill or downhill inclined shot.

The deviation at an inclined shot is created by the changed direction of the projectile movement relative to the direction of the force of gravity acting on the projectile. A comparison of the projectile trajectory for an inclined shot with the projectile trajectory for a horizontal shot shows that the projectile trajectory for an inclined shot is slightly flatter relative to the sight line. If the sight line and/or the hold point were to be aimed at the target in the same manner as for a horizontal shot, the outcome would be a so-called high shot. The latter can be prevented by reducing the exit angle (elevation), e.g. reducing the angle between the barrel axis and a horizontal plane. This can be accomplished either by reducing the superelevation angle (sight angle) or the elevation angle (terrain angle). This correction of the value of the exit angle with which the aiming device is aligned relative to the target and/or the correction with which the sight line is aligned with the target is equivalent to taking into account a substitute distance that is used in place of the actual target distance for aiming at the target. For instance, if the weapon is adjusted for a 400 m zero shot in the horizontal, the target would be missed with a high shot of typically 15-20 cm at the same shot distance of 400 m but at a terrain angle of 30°. In order to nevertheless hit the target at this terrain angle of 30°, the target can be sighted in place of the target distance of 400 m in a manner as though the target were located at a horizontal distance of approximately 350 m. This can also be expressed by the term of an equivalent horizontal distance E. The latter is for instance of significance when a so-called ballistic reticle (crosshairs) is used, wherein the reticle is equipped with different vertical markings that correspond to different zero shot distances. A zero shot is then also ensured when an inclined shot is now aimed at the target with a ballistic reticle such that as though the target were located not at the actual distance D but instead in a common horizontal plane with the firearm using a target distance with a value corresponding to the equivalent horizontal distance. Another option for taking into account the required correction for aligning the firearm and/or the aiming device for purposes of aiming at the target is to adjust the elevation of the reticle (crosshairs) with the elevation turret of the aiming device according to the equivalent horizontal distance. On the other hand, sophisticated aiming devices are also known that are equipped with ballistic computers and that display the required corrections by taking into account the terrain angle, either numerically or in the form of variable aiming points.

All these options have in common the need to determine and/or calculate the extent of the required correction for an inclined shot by some method in the most reliable manner possible. It is then the object of the present invention to specify a method and/or a device by which high shot accuracy can be achieved in a simplified manner when taking an inclined shot with a firearm.

A method, a device, and a long-range optical device of the initially mentioned type became known from AT 511 318 B 1. However, the known method requires mapping paired values of elevation angles and distance measurements to correction values corresponding to the target from a table.

The task of the present invention was to provide a simple solution for determining the horizontal substitute distance for an inclined shot, said method characterized by high accuracy at low computational effort for determining the substitute distance.

This task is solved by a method of the initially mentioned type in a manner that it comprises the following steps:
i) Calculate a substitute elevation angle from the determined elevation angle based on at least one elevation angle correction parameter and determine at least one approximation solution of a cosine of the substitute elevation angle as corresponding correction coefficient, and/or
i') Calculate a value corresponding to at least one approximation solution of a cosine for the determined elevation angle or the substitute elevation angle and determine the correction coefficient from the value corresponding to at least the approximation solution of the cosine of the determined elevation angle or the substitute elevation angle and at least one correction value;

ii) Employ the correction coefficient determined in step i) and/or in step i') to calculate the equivalent horizontal distance.

The solution according to the invention facilitates a very simple and largely sufficiently exact calculation of the substitute distance that is approximately independent of the employed munition and of the distance measured to the target.

Pursuant to a version of the invention, it can be specified that in step i) the determined elevation angle is multiplied by an elevation angle correction parameter and/or that—in order to determine the substitute elevation angle—the elevation angle correction parameter is added to the determined elevation angle and/or subtracted from the determined elevation angle, and/or that—in order to determine the substitute elevation angle—the determined elevation angle is exponentiated with the elevation angle correction parameter.

Moreover, in step i'), the value corresponding to the cosine of the determined elevation angle or the substitute elevation angle can be exponentiated and/or multiplied with the correction value and/or can be added to the correction value and/or subtracted from the latter.

The elevation angle correction parameter used in step i) can be a constant or a variable dependent on the determined elevation angle.

In the multiplication application or in the application as an exponent, the elevation angle correction parameter is preferably less than 1, in particular less than 1 and greater than 0.7.

According to a version of the invention, the elevation angle correction parameter can correspond to a specified percentage of the determined elevation angle.

The correction value employed in step i') can further be a constant or a variable dependent on the determined elevation angle.

In order to facilitate a fast determination of the equivalent horizontal distance (substitute distance), it is advantageous when the elevation angle correction parameters and/or values of the correction coefficient and/or equivalent horizontal distances for different values of the determined elevation angle are calculated and the results are summarized and stored in the form of a table.

The aforementioned task can also be solved with a device of the initially specified type, on which a microprocessor is arranged according to the invention in order to use a value as correction coefficient that corresponds at least to an approximation solution of a cosine of a substitute elevation angle, wherein the substitute elevation angle corresponds to the elevation angle corrected with an elevation angle correction parameter, and/or in order to use an amount corrected with a correction value, said amount used as a correction coefficient and corresponding to at least an approximation solution of a cosine of the elevation angle or the substitute elevation angle.

On a preferred version of the invention, it can be specified that the range finder comprises a laser range finder.

Pursuant to an advantageous version of the invention, the device can comprise a memory in which various values of the elevation angle correction parameters corresponding to the elevation angle and/or various values of the correction coefficients corresponding to the elevation angle and/or equivalent horizontal distances corresponding to the elevation angle are stored in the form of a table.

The task underlying the invention can however also be solved according to the invention with a long-range optical device of the aforementioned type in a manner that the device for determining the substitute distance to be taken into account in place of the target distance is arranged as a device according to any of the claims 11 to 13.

An embodiment that gives a shooter the ability to not have to take their sight off the aimed at target in order to read the display consists of an arrangement where the display is integrated into the sight channel, in particular into the optical path of the aiming device.

A very accurate determination of the distance between the shooter and the target in alignment with the barrel of the weapon is achieved by integrating a range finder for measuring a target distance into the optical path of the aiming device.

BRIEF DESCRIPTION OF THE DRAWINGS

For a better understanding of the invention, the latter is explained in greater detail based on the following figures.

Each of the following figures show in a greatly simplified, schematic representation.

DETAILED DESCRIPTION OF THE TECHNOLOGY

Let it be noted to start that in the various embodiments, the same parts are labeled with the same reference numbers and/or the same component names, wherein the disclosures contained in the entire specification can be transferred accordingly to the same components with the same reference numbers and/or component names. Moreover, the location references selected in the specification, such as top, bottom, lateral, etc. must be applied to the immediately specified and to the rendered Figure, and said location references must be applied accordingly to the new location when the location is changed.

Figure 1:
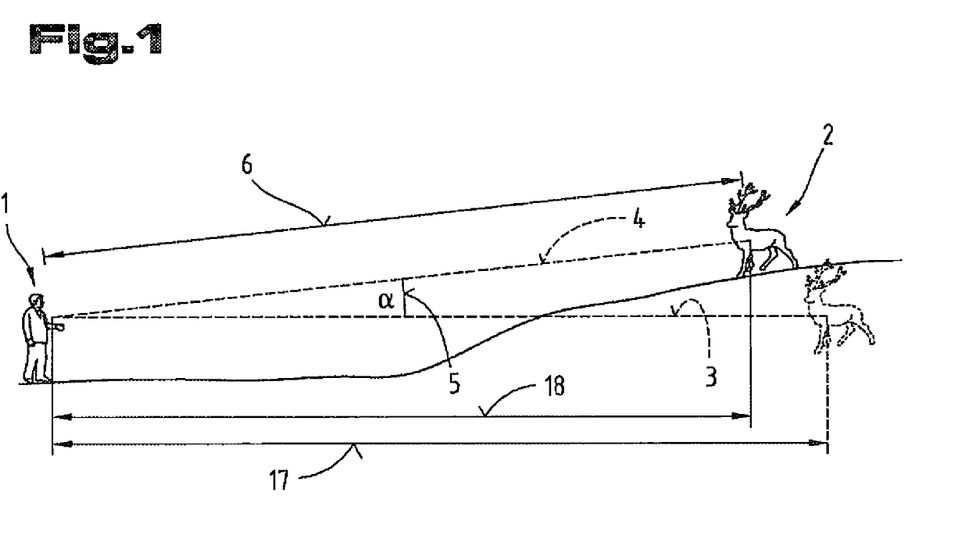
FIG. 1 a relative spatial arrangement for an inclined shot by a shooter at a target located in an elevated location.

FIG. 1 shows the relative spatial arrangement for an inclined shot uphill by a Shooter 1 at a Target 2. In this case, Target 2 is located in an elevated position relative to a Horizontal Plane 3 mapped to Shooter 1. A Sight Line 4 and/or reference line between Shooter 1 and Target 2 then forms a so-called elevation angle (terrain angle) $\alpha$ 5 with the Horizontal Plane 3. The length of the Sight Line 4 and/or the distance between Shooter 1 and Target 2 furthermore defines a Target Distance D 6. When aiming at Target 2 with a Firearm 9 (FIG. 2), Shooter 1 now must also take into account Elevation Angle $\alpha$ 5 in addition to Target Distance D 6. But this is not already sufficiently accomplished when the shooter merely realigns the firearm uphill by Elevation Angle $\alpha$ 5 and brings a target marker (FIG. 3) in alignment with Target 2, said target marker actually corresponding to the value of Target Distance D 6 for a horizontal shot. A correction must also be taken into account, said correction caused by the fact that a Trajectory 7 of a projectile for an inclined shot is less curved relative to the sight line than for a horizontal shot.

Figure 2:
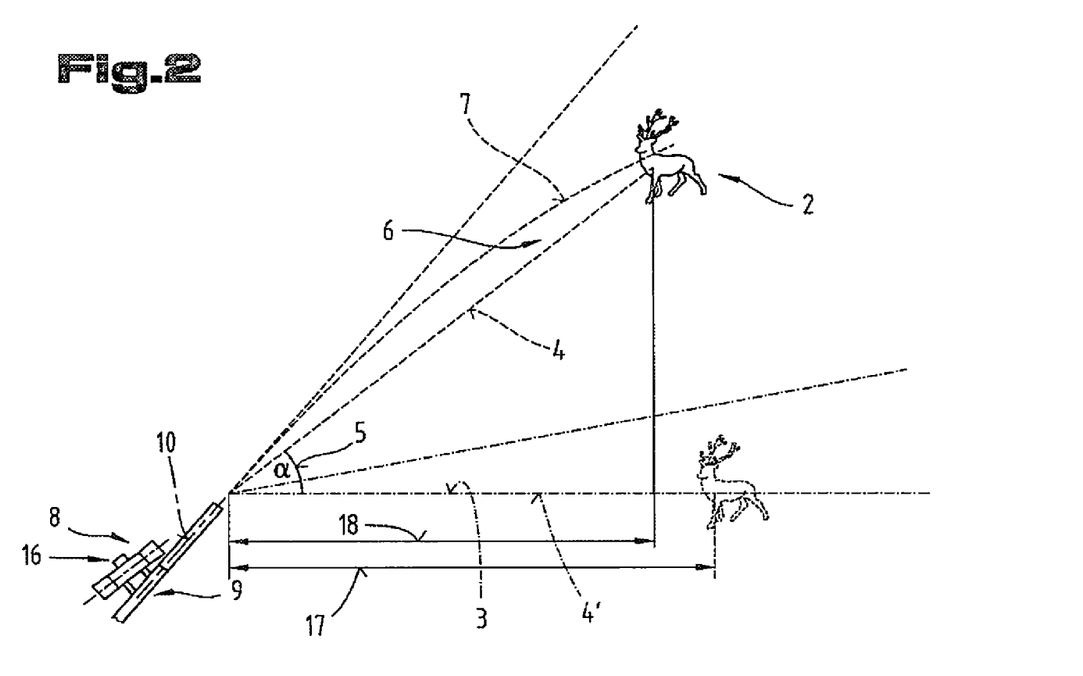
FIG. 2 a comparison of the trajectories of a projectile when aiming at the target with an inclined shot and with a horizontal shot.

FIG. 2 shows the Trajectory 7 of a projectile when aiming at Target 2 with an Aiming Device 8 of a Firearm 9 for an inclined shot pointed uphill at Elevation Angle α 5.

A Barrel Axis 10 of Firearm 9 is arranged tilted by a Superelevation Angle 11 relative to the reference line and/or Sight Line 4 of Aiming Device 8. This Superelevation Angle 11 is adjusted when Firearm 9 is zeroed in such that the trajectory of the projectile intersects the Horizontal Plane 3 at the zeroing distance. This then fulfills the specific zeroing condition that the actual impact point of the projectile matches the desired impact point of the target arranged at the zeroing distance.

Firearm 9 is generally zeroed in by performing a series of shots on target located at the zeroing distance. This means that the distance between the location of Shooter 1 and/or the muzzle of Firearm 9 and the target is selected equal to the zeroing distance, wherein the muzzle of Firearm 9 and the target are also located in the common Horizontal Plane 3. If a deviation of the impact point of the projectile from the target is now determined after a shot on Target Z, an adjustment of the relative position between Sight Line 4 and Barrel Axis 10 of Firearm 9 is made, said adjustment intended to achieve that the impact point of the projectile is located closer to Target Z when a further shot is taken. Such an adjustment of the relative position of Sight Line 4 relative to Barrel Axis 10 of Firearm 9 is generally performed by making an adjustment on Elevation Turret 16 of Aiming Device 8 and/or a rifle scope, by which the position of Sight Line 4 through the optical path of Aiming Device 8 is adjusted. Such an adjustment can be used to compensate deviations of the impact point of the projectile from the target in vertical direction, and in horizontal direction with an equivalent side adjustment. In order to reduce a deviation in vertical direction, such an adjustment on Elevation Turret 16 involves adjusting Superelevation Angle 11. When zeroing in Firearm 9, the sequence of test shots and readjustments of the relative position of Sight Line 4 relative to Barrel Axis 10 of Firearm 9 is continued until a sufficient shot accuracy is achieved.

According to a generalized procedure, Firearm 9 is zeroed with a zeroing angle inclined with a predefined value relative to Horizontal Plane 3. This can be advantageous for a Firearm 9 that for instance is regularly fired from a raised platform above an otherwise level, horizontal terrain. For such an application, Firearm 9 can be zeroed with a preselected zeroing angle with a negative value. This in turn is accomplished by continuing a series of test shots with Firearm 9 and by readjusting the relative position of Sight Line 4 relative to Barrel Axis 10 of Firearm 9 until a sufficiently high shot accuracy is achieved.

If Firearm 9 is now pointed above Target 2 arranged at an elevation above Horizontal Plane 3 and the reference line and/or Sight Line 4 of Aiming Device 8 is additionally aligned with Target 2, a change of the trajectory of a projectile fired with Firearm 9 must be taken into account, wherein Trajectory 7 of the projectile is now slightly flatter relative to the sight line, e.g. having a reduced curvature compared to the horizontal shot. Trajectory 7 then causes Target 2 to be missed high. This error can be compensated by tilting Firearm 9 slightly towards Horizontal Plane 3 such that the original reference line and/or Sight Line 4 is aligned with a point located below Target 2 and Sight Line 4 forms an angle with Horizontal Plane 3 whose value is less than the value of Elevation Angle α 5. Such a correction is illustrated pursuant to FIG. 3 as described below.

When using a Firearm 9 zeroed with a zeroing angle that is tilted relative to Horizontal Plane 3, the angle difference between Elevation Angle α 5 and the zeroing angle must be taken into account in place of Elevation Angle α 5.

Figure 3:
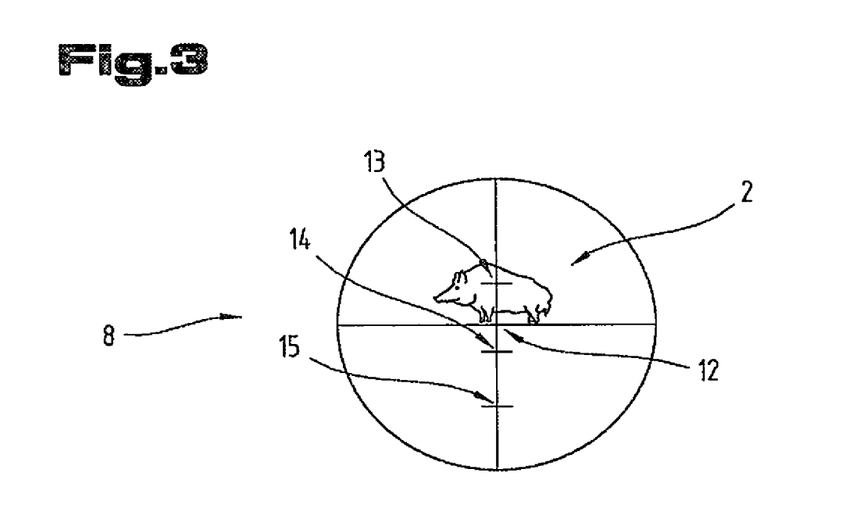
FIG. 3 an image showing the view through the aiming device when aiming at the target in accordance with FIG. 2.

FIG. 3 shows an image when looking through Aiming Device 8 while aiming at Target 2 in accordance with FIG. 2.

On this exemplary embodiment, Aiming Device 8 has a target marker arrangement with Crosshairs 12 and additional Target Markers 13, 14, and 15. The arrangement of the image of Target 2 relative to Crosshairs 12 and/or Target Markers 13, 14, 15 corresponds to the particular situation in which the correction discussed above is already taken into account. Sight Line 4 of Aiming Device 8—it corresponds to the intersection of Crosshairs 12—is aligned with a point below Target 2. Accordingly, the image of Target 2 appears above Crosshairs 12—in this case aligned with Target Marker 13.

The image in accordance with FIG. 3 can otherwise also be interpreted in connection with taking a horizontal shot for which Target 2 is located in the same Horizontal Plane 3 with Firearm 9. When the Target Marker 13 arranged above Crosshairs 12 is aligned with Target 2—as is shown—Target 2 can only be hit by the projectile when its distance from Firearm 9 is less than the zeroing distance (according to Crosshairs 12). For horizontal shots, various values of Target Distance D 6 can then be mapped to Target Marker 13, to Crosshairs 12, to Target Marker 14, and to Target Marker 15, in which case the values of Target Distance D 6 increase in the same order (Target Marker 13, Crosshairs 12, Target Marker 14, and Target Marker 15). This could for instance be accomplished while calibrating the target marker arrangement with corresponding Target Distances D6.

The values for Target Distance D 6 for horizontal shots assigned to Target Markers 13, 14, 15, and to Crosshairs 12 are however also of significance for inclined shots at Elevation Angle α 5, in which case they are used as a so-called Equivalent Horizontal Distance E 17 to take into account the specified correction of the alignment of Firearm 9 and/or Sight Line 4 of Aiming Device 8 at Target 2. In this manner, Shooter 1 uses a substitute distance in place of the actual Target Distance D 6 for aiming.

It is now of central significance to quantitatively determine the required correction. A related rule of thumb is known as the "Rifleman's Rule, according to which Target Distance D 6 is multiplied with the cosine of Elevation Angle α 5 to obtain the value of an approximate Equivalent Horizontal Distance $E_{RR}$ 18.

$$E_{RR} = D \times \cos(\alpha) \qquad \text{Eq. 1}$$

Hitting Target 2 (a zero shot) is now ensured under certain conditions when for an inclined shot at an Elevation Angle α, 5, Aiming Device 8 is now adjusted as though Target 2 were located in the same Horizontal Plane 3 as Firearm 9 and at the Equivalent Horizontal Distance $E_{RR}$.

However, calculating the Equivalent Horizontal Distance $E_{RR}$ 18 with the Rifleman's Rule, according to the aforementioned Equation 1, is only an approximation that only supplies sufficiently accurate results for Target Distances D 6 up to approx. 300 m and for values of Elevation Angle α 5 up to approx. 30°.

Figure 4:
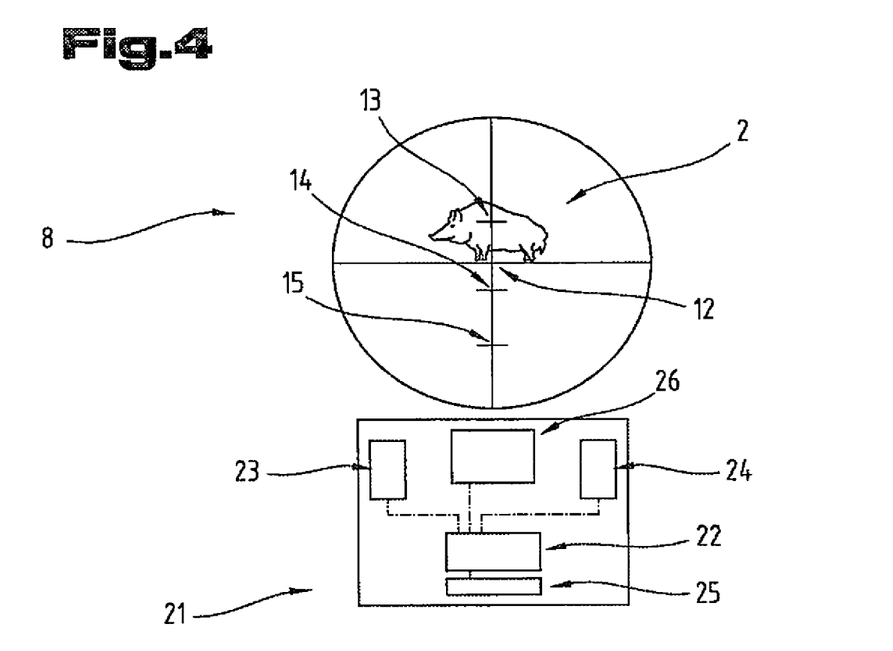
FIG. 4 a device for determining the equivalent horizontal distance E with the view through the aiming device in accordance with FIG. 3.
Figure 5:
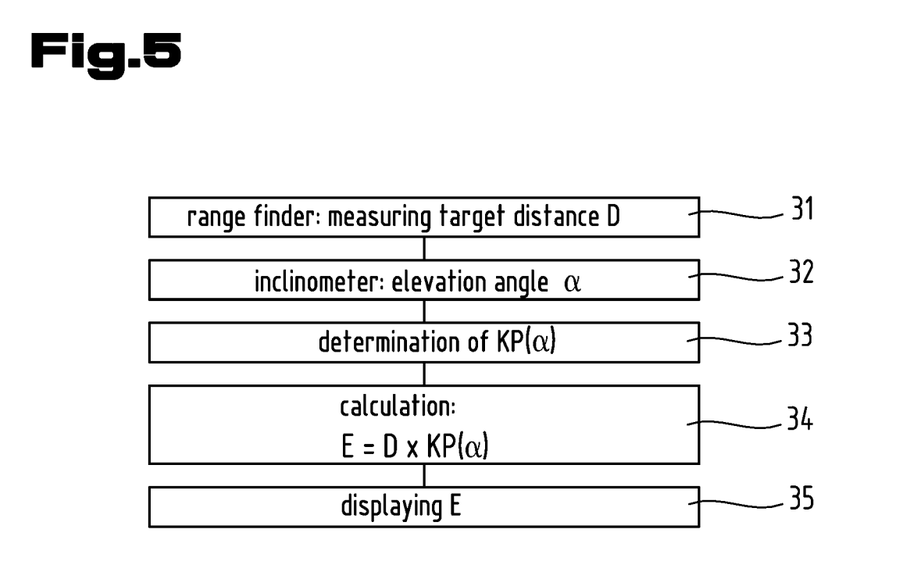
FIG. 5 a flow chart of the method steps of the method for determining the equivalent horizontal distance E.

An option for executing the method according to the invention for determining an Equivalent Horizontal Distance E 17 for aiming at Target 2 with an Aiming Device 8 and a Firearm 9 is explained based on FIG. 4. For this purpose, a Device 21 is specified for determining the Equivalent Horizontal Distance E 17, said device preferably equipped with a central microprocessor 22 to automatically execute the method. This Device 21 further comprises a Range Finder 23 for measuring the Target Distance D 6 and an Inclinometer 24 for measuring Elevation Angle α 5 at which Target 2 is displayed to Shooter 1. Based on values for Target Distance D 6 and Elevation Angle α 5 and based on an Elevation Angle Correction Parameter k and/or a Correction Value KW, Microprocessor 22 calculates a corresponding correction without taking other data in to account. The result of the calculation is shown in a Display 26. By selecting the particular target marker that corresponds to the displayed Equivalent Horizontal Distance E 17 (Target Marker 13 for the purpose of this exemplary embodiment), Shooter 1 can then align Firearm 9 and/or Aiming Device 8 with Target 2, or can make an adjustment to the superelevation angle by adjusting the elevation turret according the displayed Equivalent Horizontal Distance E 17, and then take a shot.

Device 21 for determining the Equivalent Horizontal Distance E 17 can either be arranged as a device independent of Firearm 9 and/or the aiming device or alternatively can also form a component of Firearm 9 or Aiming Device 8. In the latter case, Display 26 of Device 21 is preferably integrated into the optical path of Aiming Device 8. For this purpose, Display 26 is projected in one of the image planes of the optics of Aiming Device 8 such that the value of the calculated Equivalent Horizontal Distance E 17 is displayed to Shooter 1 in the same field of view represented by Aiming Device 8.

Pursuant to an alternative embodiment of a combination of Device 21 with a long-range optical device, for example an Aiming Device 8, Microprocessor 22—instead of displaying a numerical Equivalent Horizontal Distance E 17 on Display 26—calculates and then automatically projects a variable aiming point in the optical path of Aiming Device 8, e.g. displays a correspondingly positioned Target Marker 13, 14, 15. It is however also conceivable to take the required correction into account by means of an automated (motorized) mechanical adjustment of the elevation turret or by means of an adjustment of the reference line by shifting an optical element in the optical path of the aiming device.

A further advantage is achieved with an embodiment of the long-range optical device on which Range Finder 23 is at least partially integrated into the optical path of Aiming Device 8. For instance, on embodiments of Range Finder 23 by means of a laser range finder, this can for example be accomplished by projecting the laser beam transmitted to Target 2 and/or the laser light reflected by Target 2 through the lens of the long-range optical device.

The Equivalent Horizontal Distance E 17 can for example be determined solely on the basis of measuring Target Distance D 6 and a corrected value of Elevation Angle α 5.

As an unexpected effect, it has been shown that the solution according to the invention can be used to overcome the limitations of the Rifleman's Rule for short distances and small elevation angles. A sufficiently accurate calculation of the Equivalent Horizontal Distance E 17 for aiming at Target 2 is then possible for significantly greater distances and larger terrain angles.

The Equivalent Horizontal Distance E 17 can be determined according to the invention with a Correction Coefficient KK, for which the following applies:

$$KK = \cos(\alpha(k)), \qquad \text{Eq. 2}$$

For this purpose, Eq. 2 uses a Substitute Elevation Angle α(k), which itself is a function of an Elevation Angle Correction Parameter k.

The Equivalent Horizontal Distance E 17 is calculated with the measured Target Distance D as:

$$E = D \times KK \qquad \text{Eq. 3}$$

Elevation Angle Correction Parameter k, which can be a dimensionless number, can in this case have a value that is less than 1. For the value 1, Equation 3 transitions to the Rifleman's Rule. It has been shown to be particularly advantageous when Elevation Angle Correction Parameter k is less than 1 and greater than 0.8, in particular between 0.85 and 0.95. Particularly good results have been obtained for a constant value of 0.9.

Table 1 represents an exemplary embodiment showing a compilation of values determined from many ballistic analyses for Correction Coefficient KKB for Distances D to the target that are compared to Correction Coefficients KK as determined by the method according to the invention for Elevation Angles α, 5 of 10° and 30°. A value of 0.9 was assumed in this case for Elevation Angle Correction Parameter k.

TABLE 1

| | D[m] | k | KKB | KK | $KK_{RR}$ | KKB − KK | KKB − $KK_{RR}$ | ΔKK × D | $\Delta kk_{RR} \times D$ |
|---|---|---|---|---|---|---|---|---|---|
| 10° | 100 | 0.9 | 0.986 | 0.988 | 0.985 | −0.002 | 0.001 | −0.2 | 0.1 |
| | 200 | 0.9 | 0.987 | 0.988 | 0.985 | −0.001 | 0.002 | −0.2 | 0.4 |
| | 300 | 0.9 | 0.989 | 0.988 | 0.985 | 0.001 | 0.004 | 0.3 | 1.2 |
| | 400 | 0.9 | 0.99 | 0.988 | 0.985 | 0.002 | 0.005 | 0.8 | 2 |
| | 500 | 0.9 | 0.991 | 0.988 | 0.985 | 0.003 | 0.006 | 1.5 | 3 |
| 30° | 100 | 0.9 | 0.876 | 0.891 | 0.866 | −0.015 | 0.01 | −1.5 | 1 |
| | 200 | 0.9 | 0.884 | 0.891 | 0.866 | −0.007 | 0.018 | −1.4 | 3.6 |
| | 300 | 0.9 | 0.893 | 0.891 | 0.866 | 0.002 | 0.027 | 0.6 | 8.1 |
| | 400 | 0.9 | 0.902 | 0.891 | 0.866 | 0.011 | 0.036 | 4.4 | 14.4 |
| | 500 | 0.9 | 0.91 | 0.891 | 0.866 | 0.019 | 0.044 | 9.5 | 22 |

Table 1 also shows the values of Correction Coefficients $KK_{RR}$ achievable using the Rifleman's Rule, which correspond to the strict cosine of the corresponding angles ($KK_{RR}$=cos(10°) and/or cos(30°)). While these supply comparatively good results for short distances, their results degrade for longer distances. This is clearly evident in the differences of the equivalent horizontal distance in the last two columns, which generate approximately twice the absolute error for the Rifleman's Rule versus the method according to the invention.

For instance, when a value of 0.9 is assumed in Tables 1 for Elevation Angle Correction Parameter k, this corresponds to a correction of Elevation Angle α, 5 by 10%. This means that the corrected elevation angle used for the calculation is 10% less than the measured Elevation Angle α, 5.

TABLE 2

| $α_i$ [°] | $k_i$ | KKB(α) | KK(α) | $KK_{RR}(α)$ | KKB(α) − KK(α) | KKB(α) − $KK_{RR}(α)$ |
|---|---|---|---|---|---|---|
| 10 | 0.906 | 0.988 | 0.988 | 0.985 | 0.000 | 0.003 |
| 20 | 0.907 | 0.951 | 0.950 | 0.940 | 0.001 | 0.012 |
| 30 | 0.909 | 0.890 | 0.889 | 0.866 | 0.001 | 0.024 |
| 40 | 0.913 | 0.804 | 0.804 | 0.766 | 0.000 | 0.038 |
| 50 | 0.918 | 0.693 | 0.696 | 0.643 | −0.003 | 0.050 |

Table 2 shows Elevation Angle Correction Parameters $k_i$ dependent on measured Elevation Angles α, 5. Here again, the results show that the correction based on the Rifleman's Rule generates much larger deviations for larger angles than the method according to the invention.

The dependency of Elevation Angle Correction Parameter $k_i$ on Elevation Angle α, 5 can for example be determined as follows (and by other means) from Correction Coefficient KKB as determined in ballistic analyses and as further optimized:

$$k_i = α_i^{-1} \times \arccos(KKB_i), \text{ with } i=0, \ldots n; [n \in \mathbb{N}]$$ Eq. 4

Alternatively, Elevation Angle Correction Parameter $k_i$ can be determined in a manner that—starting with a measured Elevation Angle α, 5, for example at 0° and increases of the measured Elevation Angle α, 5—the value of $k_i$ is corrected by a correction using a percentage that declines with the measured value of Elevation Angle α, 5. For instance, for measured Elevation Angles α between 10°-15°, a correction of the measured values by 10% can be applied. At measured Elevation Angles α between 15°-20°, a smaller correction, for example by 9%, can be applied, etc.

Tables 1 and 2 show that Elevation Angle Correction Parameter k is less than 1, in particular less than 1 and greater than 0.8.

As shown in the aforementioned exemplary embodiments, the Correction Coefficients KK used by the method according to the invention only slightly deviate from values for Correction Coefficients KKB as determined in ballistic analyses. For an inclined shot, the method according to the invention can be used to determine the Equivalent Horizontal Distance E 17 with relatively high accuracy with little effort and largely independently of the employed munition and Distance D to the target.

Alternatively to Equation 2, the value of Correction Coefficient KK can for example also be determined and/or applied in the following manners:

$$KK = \cos(α^k)$$ Eq. 5

$$KK = \cos(α+/-k)$$ Eq. 6

$$KK = \cos(α \times k)$$ Eq. 7

$$KK = \cos^k(α)$$ Eq. 8

$$KK = KW \times \cos(α)$$ Eq. 9

$$KK = KW +/- \cos(α)$$ Eq. 10

$$KK = KW \times \cos(α \times k)$$ Eq. 11

$$KK = KW +/- \cos(α \times k)$$ Eq. 12

$$KK = KW \times \cos^k(α)$$ Eq. 13

$$KK = KW \times \cos(α^k)$$ Eq. 14

$$KK = KW \times \cos(α+/-k)$$ Eq. 15

$$KK = KW +/- \cos(α+/-k)$$ Eq. 16

$$KK = KW +/- \cos(α^k)$$ Eq. 17

$$KK = KW +/- \cos^k(α)$$ Eq. 18

$$KK = \cos^{KW}(α(k))$$ Eq. 19

The variables in Equations 5 to 19 mean:
KK—Correction Coefficient, KW—Correction Value, k—Elevation Angle Correction Parameter, α—the measured Elevation Angle.

The values for Correction Values KW can for example be determined by equating Equations 8-19 with Equation 7, wherein Elevation Correction Parameter k is represented either by using a constant value determined for all Elevation Angles α, 5, for example 0.9 or 0.85 or a variable Elevation Angle Correction Parameter k dependent on the determined Elevation Angles α, 5, for example the values for k shown in Table 2.

If the method according to the invention involves use of Equations 2 or 5 to 7, this corresponds to calculating a substitute elevation angle from the measured Elevation Angle α, 5 based on at least one Elevation Angle Correction Parameter k and determining a value corresponding to a cosine of the substitute elevation angle as Correction Coefficient KK in a Step i).

If by contrast one of Equations 8 to 19 are used to calculate Correction Coefficient KK, this corresponds to calculating a value corresponding to a cosine of the determined Elevation Angle α, 5 or of the substitute elevation angle and determining Correction Coefficient KK from the values corresponding to the cosine of the determined Elevation Angle α, 5 or of the substitute elevation angle and at least one Correction Value KW in a Step i').

Let it be noted at this point that the Correction Parameter k shown in Equation 8 can also be understood as Correction Value KW since the value corresponding to the cosine of the determined Elevation Angle α, 5 is exponentiated. The value of Correction Value KK can then correspond to that of Elevation Angle Correction Parameter k.

The Elevation Angle Correction Parameter k used in Equation 8 can however also have the same value as the Elevation Angle Correction Parameter k used in Equation 2.

In a Step ii) following Step i) or i') the Equivalent Horizontal Distance E 17 is calculated according to Equation 2 based on the value determined for Correction Coefficient KK. The Correction Value KW used in Step i') according to Equation 9, 11, 13-15 is preferably less than 1, in particular less than 1 and greater than 0.7.

Figure 6:
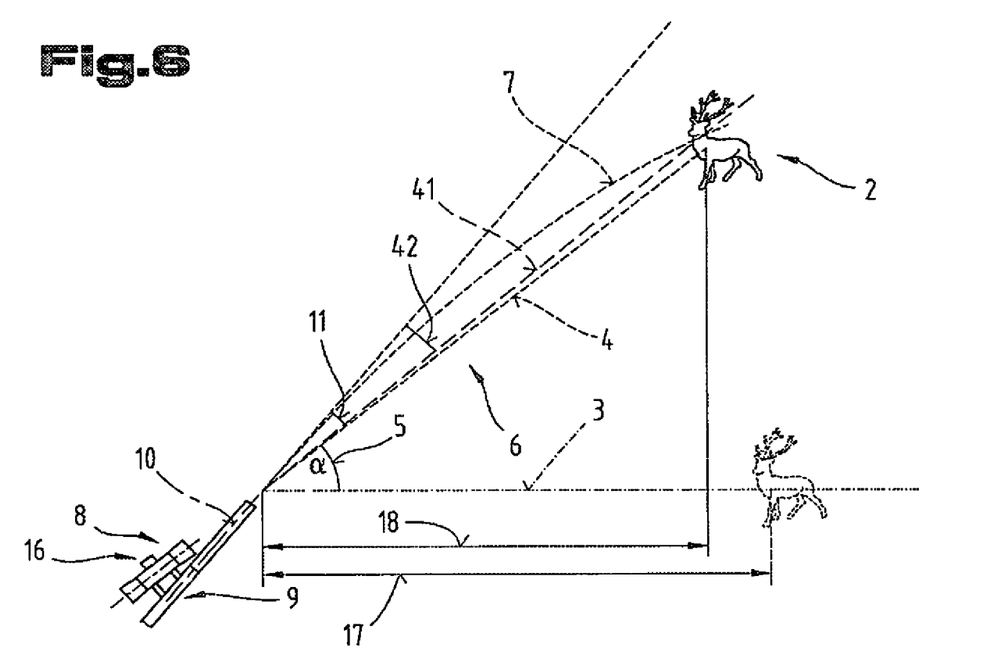
FIG. 6 the process of aiming at a target with the aiming device of a firearm.
Figure 7:
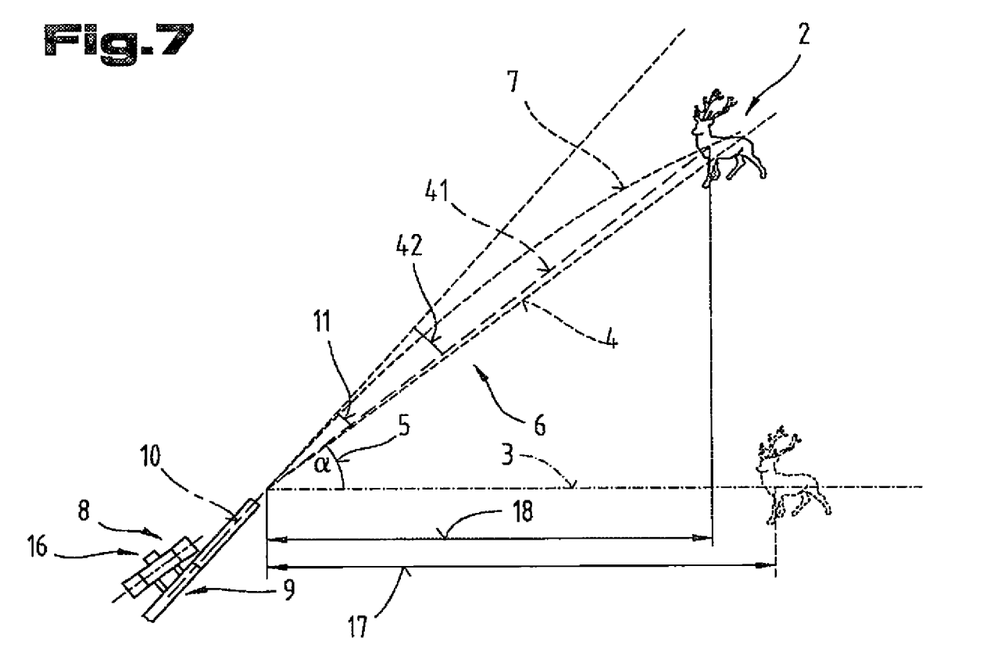
FIG. 7 the process of aiming at a target in accordance with FIG. 6 by taking into account the correction according to the invention.

The execution of an inclined shot while using the method according to the invention is discussed in greater detail based on the depictions in FIGS. 6 and 7.

The depiction in FIG. 6 shows the process of aiming at Target 2 with Aiming Device 8 with a relative position of Sight Line 4—the relative position unchanged after zeroing Firearm 9—through the optical path of Aiming Device 8 relative to Barrel Axis 10 of Firearm 9. As already discussed above in the description of FIG. 2, this situation results in a change of Trajectory 7 of the projectile toward a slightly flatter projection of the trajectory relative to Sight Line 4, resulting in missing Target 2 high. According to the method, instead of firing a shot on Target 2 in this situation, Shooter 1 enables Device 21 (FIG. 4) while keeping Crosshairs 12 aligned with Target 2. This triggers a measurement of Target Distance D 6 by Range Finder 23 and a measurement of Elevation Angle α 5 by Inclinometer 24. Based on the measurement values obtained as a result, Microprocessor 22 of Device 21 then determines the Equivalent Horizontal Distance E 17, which is then rendered on Display 26 in a final step. In the event a reticle with several Target Markers 13, 14, 15 as described in FIG. 4 is used, Shooter 1 will now select the particular target marker that corresponds to the rendered, Equivalent Horizontal Distance E 17. This is equivalent to selecting a new Reference Line 41 that differs from Sight Line 4, where Sight Line 41 forms a smaller Angle 42 relative to Superelevation Angle 11 together with Barrel Axis 10 of Firearm 9. If Device 21 is not integrated into Aiming Device 8, but is instead arranged as an independent unit, the shooter uses Device 21 to determine the Equivalent Horizontal Distance E 17 in an initial step and then proceeds with Aiming Device 8 in a second step as described above.

Shooter 1 now has the ability to align Reference Line 41 with Target 2. Shooter 1 does so by tilting Firearm 9 until Reference Line 41 forms the new sight line onto Target 2, which also causes the trajectory of the projectile to change in accordance with Trajectory 7 onto Target 2. In FIG. 7, Barrel Axis 10 of Firearm 9 is then arranged at an incline compared to the position in FIG. 6 by an angle corresponding to the difference between Superelevation Angle 11 and the new Superelevation Angle 42.

According to an alternative embodiment, the alignment of Firearm 9 with Target 2 is corrected by an adjustment with the assistance of a change of Elevation turret 16 of Aiming Device 8. The relative position between Sight Line 4 of Aiming Device 8 and Barrel Axis 10 of Firearm 9 is in this case achieved with a direct adjustment of Superelevation Angle 11 with the assistance of Elevation turret 16. This means that the process of aiming at Target 2 in both situations involves aligning the same Crosshairs 12 (FIG. 4) with Target 2. As a consequence thereto, Shooter 1 inclines Firearm 9 also in this version of the method by an angle according to the value of the difference between the original Superelevation Angle 11 and new revised Superelevation Angle 42 in order to reliably hit Target 2 when taking a shot. The described adjustment of Elevation turret 16 to change the relative position between Sight Line 4 as projected through the optical path of Aiming Device 8 and Barrel Axis 10 of Firearm 9 can be performed manually by Shooter 1, but is advantageously performed automatically, for example by an electro-motor powered adjustment.

The required correction when aiming at Target 2 while taking an inclined shot can then be performed with a method for determining a substitute distance between a location of Shooter 1 and an impact point of a projectile in Horizontal Plane 3. When aiming, Shooter 1 in this case takes the substitute distance into account instead of Target Distance D 6. This initially implies zeroing Firearm 9, wherein the relative position of Sight Line 4 through the optical path of Aiming Device 8 and/or the long-range optical sight relative to Barrel Axis 10 of Firearm 9 is adjusted such that a sufficiently high shot accuracy is achieved for a predeterminable projectile and a predeterminable zeroing distance for horizontal shots. When taking an inclined shot, Target Distance D 6 between the location and Target 2—which are arranged on Sight Line 4—and also Elevation Angle α 5—which is formed by Sight Line 4 and Horizontal Plane 3—are then determined. The value of Correction Coefficient KK is then subsequently determined based on Elevation Angle α 5 and an Elevation Angle Correction Parameter k. By applying Correction Coefficient KK on the value measured for Target Distance D 6, the value of a substitute distance corresponding to the Equivalent Horizontal Distance E 17 is then determined in a Horizontal Plane 3. This value of the substitute distance is then taken to adjust the relative position between Sight Line 4 and Barrel Axis 10 of Firearm 9 by the difference of the previously determined target distance and the determined substitute distance.

In order to reduce the computational effort of Microprocessor 22, it can be advantageous to calculate the Correction Coefficients KK or the substitute distance according to the method according to the invention in a preceding step and to store the results in a table (look-up table) in a memory of Device 21. Microprocessor 22 can then interpolate the corresponding values of Correction Coefficient KK or the substitute distance from the table.

Also in order to reduce the computational effort, it can be advantageous to calculate the Correction Coefficient KK dependent on Elevation Angle α 5 according to the method according to the invention in a preceding step and to approximate said Correction Coefficient KK by fitting with a polynomial function with an order greater than 2, from which the Microprocessor 22 in Device 21 can easily calculate the corresponding correction values.

The exemplary embodiments show possible embodiment versions, wherein it is noted at this point that the invention is not limited to the specifically described embodiment versions of same, but that instead various combinations of the individual embodiments among each other are also possible, and—based on the teachings for technical actions by a related invention—that this variability is based on the skills of the person trained in the art and active in this technical field.

The protected scope is specified by the claims. However, the specification and drawings shall be used for interpreting the claims. Individual attributes or attribute combinations from the shown and described different exemplary embodiments can represent independent inventive solutions. The underlying task for the independent inventive solutions can be found in the specification.

All specifications concerning value ranges in the present specification shall be understood such that these comprise arbitrary and all partial ranges thereof; e.g. the specification 1 to 10 shall be understood such that all partial ranges based on the lower limit of 1 and the upper limit of 10 are included, e.g. all partial ranges start with a lower limit of 1 or higher and end with an upper limit of 10 or lower, e.g. 1 to 1.7, or 3.2 to 8.1, or 5.5 to 10.

As a matter of form, let it be noted in conclusion that for ease of understanding the design, elements are in certain cases not shown to scale and/or enlarged and/or reduced.

| | Reference number list |
|---|---|
| 1 | Shooter |
| 2 | Target |
| 3 | Horizontal Plane |

-continued

| | Reference number list |
|---|---|
| 4 | Sight Line |
| 5 | Elevation Angle α |
| 6 | Target Distance D |
| 7 | Trajectory |
| 8 | Aiming Device |
| 9 | Firearm |
| 10 | Barrel Axis |
| 11 | Superelevation Angle |
| 12 | Crosshairs |
| 13 | Target Marker |
| 14 | Target Marker |
| 15 | Target Marker |
| 16 | Elevation Turret |
| 17 | Equivalent Horizontal Distance E |
| 18 | Equivalent Horizontal Distance $E_{RR}$ calculated with Rifleman's Rule |
| 19 | |
| 20 | |
| 21 | Device |
| 22 | Microprocessor |
| 23 | Range Finder |
| 24 | Inclinometer |
| 25 | Memory |
| 26 | Display |
| 27 | |
| 28 | |
| 29 | |
| 30 | |
| 31 | Method Step |
| 32 | Method Step |
| 33 | Method Step |
| 34 | Method Step |
| 35 | Method Step |

The invention claimed is:

1. A method for determining a substitute distance between a vantage point and a substitute impact point of a firearm projectile in a horizontal plane common with the vantage point, the method including:
    determining a target distance between the vantage point and a target arranged on a sight line by a distance measuring device, and
    determining an elevation angle formed by the sight line with the horizontal plane by an elevation angle measuring device;
    calculating, by a microprocessor, an equivalent horizontal distance as a substitute distance by correcting the determined target distance with at least a correction coefficient dependent on the determined elevation angle, wherein calculating the equivalent horizontal distance performed by the microprocessor comprises:
    i) calculating a substitute elevation angle from the determined elevation angle based on at least an elevation angle correction parameter and determining the correction coefficient corresponding to at least an approximation solution of a cosine of the substitute elevation angle, and/or
    i') calculating a value corresponding to at least an approximation solution of a cosine of the determined elevation angle or of the substitute elevation angle and determining the correction coefficient from the value corresponding at least to the approximation solution of the cosine of the determined elevation angle or of the substitute elevation angle and at least a correction value, and
    ii) using the correction coefficient determined in step i) and/or in step i') to calculate the equivalent horizontal distance; and
    (iii) displaying the value of the calculated equivalent horizontal distance on a display.

2. The method according to claim 1, wherein, in step (i), the elevation angle correction parameter is multiplied with a value of the determined elevation angle and/or in that in order to determine the substitute elevation angle, the elevation angle correction parameter is added to the determined elevation angle and/or subtracted from the determined elevation angle, and/or in that in order to determine the substitute angle, the determined elevation angle is exponentiated with the elevation angle correction parameter.

3. The method according to claim 1, wherein, in step (i'), the cosine of the determined elevation angle or the value corresponding to the substitute elevation angle is exponentiated and/or multiplied with the correction value and/or added to the correction value and/or subtracted from the correction value.

4. The method according to claim 1, wherein the elevation angle correction parameter used in step (i) is a constant or a variable dependent on the determined elevation angle.

5. The method according to claim 1, wherein the elevation angle correction parameter is less than 1 and greater than 0.8.

6. The method according to claim 1, wherein the elevation angle correction parameter corresponds to a specified percentage of the determined elevation angle.

7. The method according to claim 1, wherein the correction value used in step (i') is a constant or a variable dependent on the determined elevation angle.

8. The method according to claim 1, wherein the correction value used in step (i') is less than 1 and greater than 0.7.

9. The method according to claim 1, wherein for different values of the determined elevation angle, elevation angle correction parameters and/or correction coefficients and/or equivalent horizontal distances are calculated and the results are compiled and stored in the form of a table.

10. A device for determining a substitute distance between a vantage point and a substitute impact point of a projectile in a horizontal plane common with the vantage point and for aiming at a target, having a range finder for measuring a target distance and having an inclinometer for measuring an elevation angle between a sight line to the target and the horizontal plane, wherein the device comprises:
    a microprocessor arranged to calculate as the substitute distance an equivalent horizontal distance for an inclined shot with the elevation angle by correcting the target distance with a correction coefficient,
    wherein the microprocessor is arranged to use the correction coefficient corresponding to at least an approximation solution of a cosine of a substitute elevation angle, wherein the substitute elevation angle corresponds to the elevation angle corrected with an elevation angle correction parameter, and/or said microprocessor is arranged to use the correction coefficient corresponding to at least an approximation solution of a cosine of the elevation angle or the substitute elevation angle corrected with a correction value.

11. The device in accordance with claim 10, wherein the range finder comprises a laser range finder.

12. The device in accordance with claim 11, wherein the device further comprises a memory configured to store values of the elevation angle correction parameter corresponding to different values of the elevation angle and/or values of the correction coefficient corresponding to different values of the elevation angle and/or equivalent horizontal distances corresponding to different values of the elevation angle, in the form of a table.

13. A long-range optical device comprising:
a device for determining a substitute distance to be taken into account in place of the target distance for aiming at the target with a firearm; and
a display for rendering a value of the substitute distance for aiming to a shooter, characterized in that the device for determining an equivalent horizontal distance to be taken into account in place of the target distance is arranged as a device in accordance with claim 10.

14. The long-range optical device according to claim 13, wherein the device for determining the equivalent horizontal distance to be taken into account in place of the target distance is arranged as a device in accordance with claim 11.

15. The long-range optical device according to claim 13, wherein the device for determining the equivalent horizontal distance to be taken into account in place of the target distance is arranged as a device in accordance with claim 12.

16. The long-range optical device according to claim 13, wherein the display is integrated into a sight path, in particular into an optical path, of the long-range optical device.

17. The long-range optical device according to claim 13, wherein a range finder for measuring a target distance is integrated into an optical path of the long-range optical.

18. A device for determining a substitute distance between a vantage point and a substitute impact point of a projectile in a horizontal plane common with the vantage point, wherein the device comprises:
a microprocessor arranged to calculate as the substitute distance an equivalent horizontal distance for an inclined shot at a target at a target distance and an elevation angle between a sight line to the target and the horizontal plane by correcting the target distance with a correction coefficient, wherein the microprocessor is arranged to use the correction coefficient corresponding to at least an approximation solution of a cosine of a substitute elevation angle, wherein the substitute elevation angle corresponds to the elevation angle corrected with an elevation angle correction parameter, and/or said microprocessor is arranged to use the correction coefficient corresponding to at least an approximation solution of a cosine of the elevation angle or the substitute elevation angle corrected with a correction value.

* * * * *